3,657,137
NUCLEAR FUEL COMPRISING URANIUM DIOXIDE IN A POROUS CERAMIC OXIDE MATRIX
Thomas J. Burke, Jack Belle, and John C. Clayton, Pittsburgh, Pa., assignors to the United States of America as represented by the United States Atomic Energy Commission
No Drawing. Filed June 4, 1964, Ser. No. 374,227
Int. Cl. C09k 1/30
U.S. Cl. 252—301.1                    2 Claims

ABSTRACT OF THE DISCLOSURE

A new ceramic-type nuclear fuel consisting of particles of uranium dioxide embedded in a matrix of zirconium oxide wherein the uranium dioxide particles are partially separated from the matrix by an annular void is prepared by mixing uranium trioxide with calcium-oxide-containing zirconium dioxide powder and a small quantity of a binder, pressing the mixture and firing the mixture in an atmosphere of hydrogen.

---

The invention described herein was made in the course of, or under, a contract with the United States Atomic Energy Commission.

This invention deals with an improved ceramic-type nuclear fuel in which an oxide of fissionable material is embedded in a refractory oxide; this fuel is used in a great number of nuclear reactors and in particular in power reactors. The process of making the novel fuel is also part of this invention.

It is an object of this invention to provide a ceramic-type nuclear fuel which has a high degree of fission-gas retention and which shows a minimum of swelling when used in a nuclear reactor. As a consequence of these features, the nuclear fuel also has an increased service life.

The objects of this invention are accomplished by mixing particles of a reducible fissionable compound, the fuel proper, with particles of a ceramic oxide; shaping the mixture thus obtained into the form desired of the fuel element at superatmospheric pressure and heating the shaped elements in a reducing atmosphere. By heating or "firing" the reducible-compound-containing mixture in a reducing gas, the compound is reduced; it thereby experiences a certain degree of shrinkage, while the ceramic particles surrounding the fuel particles retain their original shape; this in turn results in the formation of a sealed void around the fuel particle. These voids quasi form reservoirs for the fission gas formed during exposure of the fuel to neutrons in the nuclear reactor.

Various compounds can be used as the fuel proper. The higher oxides of uranium, $UO_3$ or $U_3O_8$, and of plutonium are especially well suitable for the product and the process of this invention. Uranium trioxide is the preferred fuel compound; it is mainly reduced to the uranium dioxide during the processing. Fuel oxide particles of approximately spherical shape are preferred.

The ceramic matrix material also is preferably an oxide; beryllium oxide, aluminum oxide and zirconium oxide, preferably in granular form, have been found satisfactory. When zirconium oxide is the matrix material, it is advantageously stabilized in the cubic crystal structure by the addition of a small quantity of calcium oxide, as is known to those skilled in the art.

The addition of a small quantity of a binder compound to the fuel-matrix mixture is optional, though advisable to facilitate shaping of the mixture. Polyethylene glycol waxes were found suitable for this purpose, and a quantity of about 2% by weight of the fuel-ceramic mixture is adequate. The binder is volatilized during firing.

Before firing, the mixture is pressed into the shape desired of the final fuel element, which can be done by compacting and/or by extrusion. The firing temperature depends on the materials to be treated, but a temperature of between 1500 and 2000° C. has generally been found satisfactory for the materials studied. Various types of gases can be used for the reducing atmosphere during firing; for instance, hydrocarbons were found suitable. However, an atmosphere of hydrogen is preferred.

EXAMPLE I

To granular uranium dioxide of a particle size of $-40$ mesh there were added 10% by weight of uranium trioxide of substantially spherical particles. Two percent by weight of polyethylene glycol wax of a molecular weight of about 6000 were then admixed to the matrix-fuel mass. The mixture thus obtained was dry-pressed into pellets using a pressure of 20 t.s.i., and the pellets were then fired at approximately 1700° C. for about 15 hours. The uranium trioxide was reduced in this step to uranium dioxide, which occupied a lesser volume than did the trioxide particles, so that voids formed around the individual particles. The uranium dioxide particles formed by reduction of the trioxide are more porous than those of the ceramic in which they are embedded. The voids amounted to 30% of the volume of the sintered uranium dioxide particles formed by reduction.

EXAMPLE II

Another test was carried out analogously to that of Example I; however, here the uranium trioxide had a particle size of $-140$ mesh. The matrix in this case was zirconium dioxide stabilized in the cubic crystal system by a small quantity of calcium oxide. Firing was carried out at about 1600° C. for 14 hours. The product has annular voids around the uranium dioxide fuel particles.

It will be understood that the invention is not to be limited to the details given herein but that it may be modified within the scope of the appended claims.

What is claimed is:
1. A process of producing a nuclear ceramic-type fuel, comprising mixing 10% by weight of uranium trioxide with about 88% by weight of calcium-oxide-containing zirconium dioxide powder and 2% by weight of polyethylene glycol wax of a molecular weight of about 6000, pressing the mixture obtained into the shape desired of the fuel using a pressure of about 20 t.s.i., and firing the shaped fuel at a temperature of about 1600° C. in an atmosphere of hydrogen.
2. As a new product of manufacture, a ceramic-type nuclear fuel consisting of particles of uranium dioxide embedded in a matrix of a zirconium oxide, said uranium oxide particles being partially separated from said zirconium oxide particles by an annular void.

References Cited
UNITED STATES PATENTS

| 2,805,473 | 9/1957 | Handwerk et al. | 176—89 |
| 3,044,946 | 7/1962 | Litton | 176—89 |
| 3,230,278 | 1/1966 | Bauschmann et al. | 264—0.5 |

LELAND A. SEBASTIAN, Primary Examiner

U.S. Cl. X.R.
176—89; 264—0.5